(12) United States Patent
Jertson et al.

(10) Patent No.: US 9,987,529 B2
(45) Date of Patent: *Jun. 5, 2018

(54) GOLF CLUB HEADS AND METHODS OF MANUFACTURING GOLF CLUB HEADS

(71) Applicant: Karsten Manufacturing Corporation, Phoenix, AZ (US)

(72) Inventors: Marty R. Jertson, Cave Creek, AZ (US); David L. Petersen, Peoria, AZ (US); Jacob T. Clarke, Phoenix, AZ (US)

(73) Assignee: Karsten Manufacturing Corporation, Phoenix, AZ (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/355,160

(22) Filed: Nov. 18, 2016

(65) Prior Publication Data

US 2017/0203165 A1 Jul. 20, 2017

Related U.S. Application Data

(60) Continuation-in-part of application No. 14/711,680, filed on May 13, 2015, now Pat. No. 9,504,888, which is a division of application No. 13/476,834, filed on May 21, 2012, now Pat. No. 9,050,509.

(60) Provisional application No. 61/619,901, filed on Apr. 3, 2012, provisional application No. 62/339,663, filed on May 20, 2016.

(51) Int. Cl.
*A63B 53/04* (2015.01)

(52) U.S. Cl.
CPC .... *A63B 53/047* (2013.01); *A63B 2053/0408* (2013.01); *A63B 2053/0445* (2013.01); *A63B 2053/0479* (2013.01)

(58) Field of Classification Search
CPC .......... A63B 53/047; A63B 2053/0445; A63B 2053/0408; A63B 2053/0479
USPC .................................. 473/324–350, 287–292
See application file for complete search history.

(56) References Cited

U.S. PATENT DOCUMENTS

| | | | |
|---|---|---|---|
| 4,858,929 A | 8/1989 | Long | |
| 5,591,092 A | 1/1997 | Gilbert | |
| 5,676,605 A | 10/1997 | Kobayashi | |
| 6,733,400 B2 | 5/2004 | Sherwood | |
| 6,814,673 B2 | 11/2004 | Wahl et al. | |
| 7,014,568 B2 | 3/2006 | Pelz | |
| 7,156,571 B2 | 1/2007 | Mook | |

(Continued)

FOREIGN PATENT DOCUMENTS

| | | |
|---|---|---|
| JP | 2009153921 | 7/2009 |
| JP | 2009178257 | 8/2009 |

*Primary Examiner* — Sebastiano Passaniti

(57) ABSTRACT

A golf club head, and method of manufacturing said golf club head are described herein. The golf club head comprises a club face with a face portion, and grooves positioned on the club face. The grooves comprise a bottom, a first side wall adjacent the bottom, a second side wall adjacent the bottom, a first top radius adjacent the first side wall, and a second top radius adjacent the second side wall. The club face further comprises a second portion positioned between the face portion, and the first top radius and the second top radius. The second portion of the club face allows for the grooves to appear visually wider to a player, which can provide psychological effects to benefit performance, while still conforming to USGA groove widths standards.

18 Claims, 13 Drawing Sheets

(56) References Cited

U.S. PATENT DOCUMENTS

| | | |
|---|---|---|
| 7,641,570 B2 | 1/2010 | Yokota |
| 7,674,188 B2 | 3/2010 | Ban |
| 7,691,007 B2 | 4/2010 | Ban et al. |
| 7,798,917 B2 | 9/2010 | Nguyen et al. |
| 7,798,918 B2 | 9/2010 | Ban |
| 7,824,279 B2 | 11/2010 | Ban et al. |
| 7,846,033 B2 | 12/2010 | Kato |
| 7,862,450 B2 | 1/2011 | Gilbert et al. |
| 7,905,797 B2 | 3/2011 | Gilbert |
| 7,905,798 B2 | 3/2011 | Petrsen |
| 7,922,601 B2 | 4/2011 | Ban |
| 7,927,230 B2 | 4/2011 | Solheim |
| 7,976,405 B2 | 7/2011 | Gilbert |
| 8,029,384 B2 | 10/2011 | Chen |
| 8,066,586 B2 | 11/2011 | Solheim |
| 8,118,688 B2 | 2/2012 | Nakamura |
| 8,172,699 B2 | 5/2012 | Nakamura |
| 8,210,966 B2 | 7/2012 | Gilbert et al. |
| 8,240,021 B2 | 8/2012 | Gilbert et al. |
| 8,282,505 B2 | 8/2012 | Abe |
| 8,409,029 B2 | 4/2013 | Ban et al. |
| 8,444,503 B2 | 5/2013 | Kumamoto |
| 8,468,679 B2 | 6/2013 | Cackett |
| 8,562,456 B2 | 10/2013 | Sugimoto |
| 8,602,911 B2 | 12/2013 | Solheim |
| 8,608,592 B2 | 12/2013 | Deng |
| 8,764,578 B2 | 7/2014 | Solheim |
| 8,814,720 B2 | 8/2014 | Solheim |
| 8,827,833 B2 | 9/2014 | Amano |
| 8,834,291 B2 | 9/2014 | Ban |
| 9,011,268 B2 | 4/2015 | Ban |
| 9,033,820 B2 | 5/2015 | Kato |
| 9,050,509 B2 | 6/2015 | Jertson |
| 9,504,888 B2 * | 11/2016 | Jertson .................. A63B 53/04 |
| 2008/0032814 A1 | 2/2008 | Ban |
| 2009/0029797 A1 | 1/2009 | Ban et al. |
| 2009/0036228 A1 | 2/2009 | Ban et al. |
| 2009/0143165 A1 | 6/2009 | Ban et al. |
| 2009/0247318 A1 | 10/2009 | Ban |
| 2009/0325728 A1 | 12/2009 | Solheim |
| 2010/0035702 A1 | 2/2010 | Solheim |
| 2010/0113179 A1 | 5/2010 | Solheim |
| 2010/0210183 A1 | 8/2010 | Vincent |
| 2011/0105240 A1 | 5/2011 | Abe |
| 2011/0201448 A1 | 8/2011 | Myodo |
| 2011/0294596 A1 | 12/2011 | Ban |
| 2011/0300967 A1 | 12/2011 | Ban |
| 2012/0010016 A1 | 1/2012 | Solheim |
| 2012/0322574 A1 | 12/2012 | Solheim |
| 2013/0217513 A1 | 8/2013 | Amano |
| 2013/0225319 A1 | 8/2013 | Kato |
| 2013/0303303 A1 | 11/2013 | Ban |
| 2014/0274451 A1 | 9/2014 | Knight et al. |
| 2015/0005099 A1 | 1/2015 | Hettinger et al. |
| 2015/0133234 A1 | 5/2015 | Ban |
| 2015/0367187 A1 | 12/2015 | Ripp et al. |
| 2016/0059089 A1 | 3/2016 | Jertson et al. |

* cited by examiner

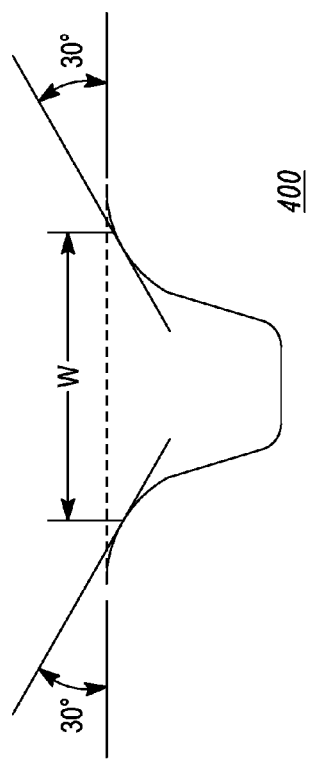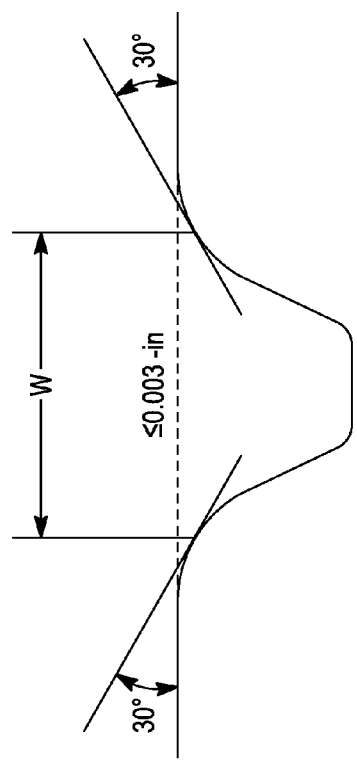
FIG. 4 (PRIOR ART)
FIG. 5 (PRIOR ART)

| PLUNGE DEPTH RANGE | ANGLE OF SECOND PORTION WITH FACE PORTION | 15° | 12° |
|---|---|---|---|
| | | RESPECTIVE VISUAL WIDTHS | |
| | UPPER LIMIT (+0.001in.; 0.003cm) | 0.048 in. (0.122 cm) | 0.052 in. (0.132 cm) |
| | SET PLUNGE DEPTH (±0.000in.; 0.0cm) | 0.040 in. (0.102 cm) | 0.043 in. (0.109 cm) |
| | LOWER LIMIT (-0.001in.; -0.003cm) | 0.033 in. (0.083 cm) | 0.034 in. (0.086 cm) |
| | VARIANCE OF VISUAL WIDTH | 0.015 in. (0.038 cm) | 0.018 in. (0.046 cm) |

*FIG. 12*

GOLF CLUB HEADS AND METHODS OF MANUFACTURING GOLF CLUB HEADS

CROSS-REFERENCE TO RELATED APPLICATIONS

This is a continuation in part of U.S. patent application Ser. No. 14/711,680, filed May 13, 2015, which is a division of U.S. patent application Ser. No. 13/476,834, filed May 21, 2012, which claims the benefit of U.S. Provisional Application No. 61/619,901, filed Apr. 3, 2012. This also claims the benefit of U.S. Provisional Application No. 62/339,663, filed May 20, 2016. The entire contents of which mentioned above are incorporated fully herein by reference.

TECHNICAL FIELD

This disclosure relates generally to golf clubs, and relates more particularly to golf club heads having grooves.

BACKGROUND

In general, a golf club includes a club face with grooves in order to increase the frictional force at impact between the club face and the ball. The United States Golf Association (USGA) publishes and maintains the Rules of Golf, which govern professional golf in the United States. Appendix II to the USGA Rules provides several limitations on the grooves for golf clubs, including limitations on symmetry, width, depth, edge radius, and relative distance between grooves. The Royal and Ancient Golf Club of St. Andrews, which is the governing authority for the rules of professional golf outside the United States, provides similar limitations to golf club design.

Moreover, an accurate hitting stoke is accomplished through a variety of subjective, as well as objective, golf club features. For example, many people subjectively associate smaller grooves with decreased ball spin at impact and with shorter distances after impact.

BRIEF DESCRIPTION OF THE DRAWINGS

To facilitate further description of the embodiments, the following drawings are provided in which:

FIG. 4 illustrates an annotated cross-sectional view of a prior art golf club;

FIG. 5 illustrates a second annotated cross-sectional view of a prior art golf club;

FIG. 12 illustrates a chart of exemplary values for use with the groove cutting tool of FIG. 11.

Figure 1:
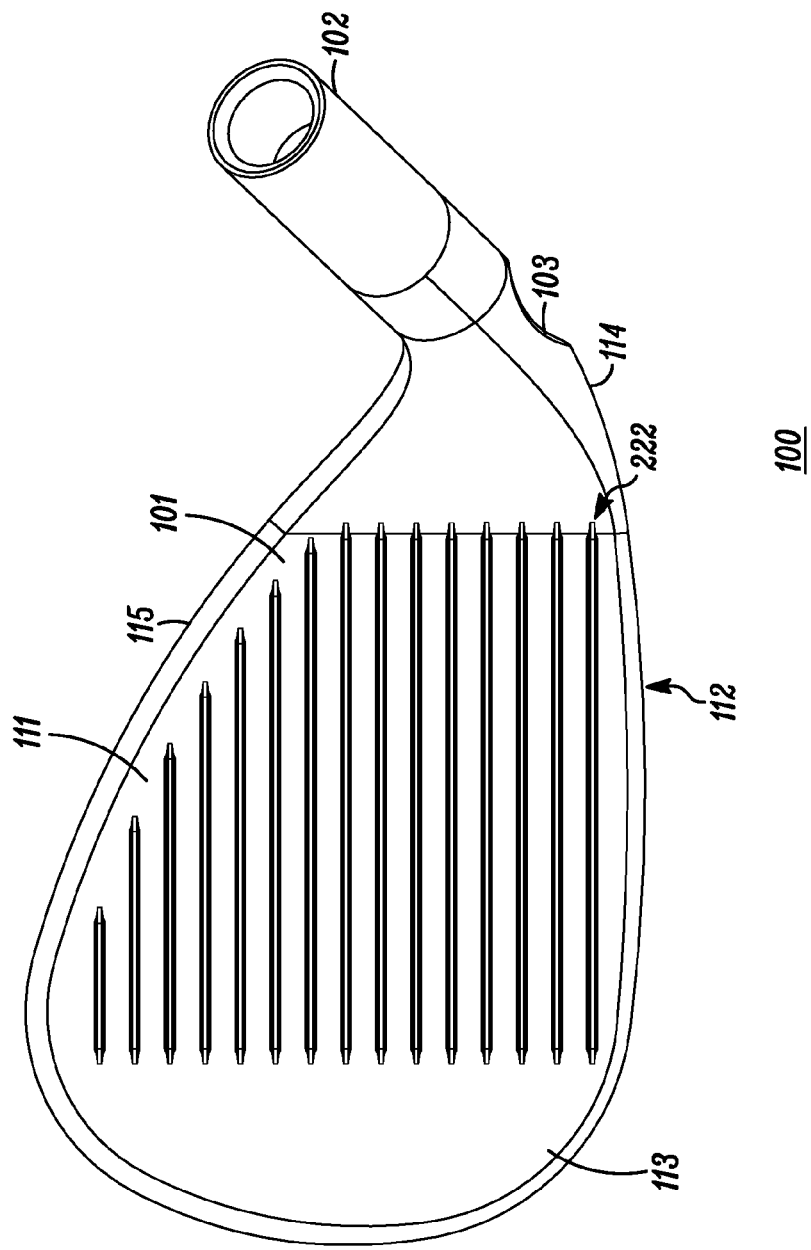
FIG. 1 illustrates a top view of a golf club, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise.

DESCRIPTION

In some embodiments, a golf club head can include: a club face to engage a golf ball, the club face having: a face portion; at least one groove in the club face, the at least one groove having a bottom, a first side wall adjacent to the bottom, a second side wall adjacent to the bottom, a first top radius adjacent to the first side wall, and a second top radius adjacent to the second side wall; and a second portion located between the face portion and a top of the at least one groove, the second portion is a substantially flat plane at a first angle with the face portion. The first angle can be between approximately eight and eighteen degrees relative to the face portion. The at least one groove is compliant with a Thirty Degree Rule when measured from the first top radius and the second top radius.

In different embodiments, a golf club can include: a golf club head having: a strike face having: a face portion; one or more channels with a first sidewall and a second sidewall, the first sidewall comprises a first thirty degree point and the second sidewall comprises a second thirty degree point; a first angled surface between the first degree point and the face portion and also between the second thirty degree points and the face portion; and a cover layer located over the face portion; and a shaft coupled to the golf club head. The face portion can be substantially flat. Each of the one or more channels can be symmetric. The first angled surface is at an eight to eighteen degree angle relative to the face portion. The cover layer has a first reflectivity and the one or more channels has a second reflectivity. The first reflectivity is different from the second reflectivity; and the first angled surface and the one or more channels are devoid of being covered by the cover layer.

In further embodiments, a method for manufacturing a golf club head including: providing a golf club head comprising a golf club face; and forming a groove and a second portion at the golf club face, forming the groove and the second portion including: rotating a groove forming tool such that the groove forming tool forms: a groove in the golf club face such that the groove is compliant with Thirty Degree Rule when measured from a first top radius of the groove and a second top radius of the groove; and a second portion adjacent to the first top radius and the second top radius of the groove and at a first angle of approximately eight to eighteen degrees relative to the golf club face of the golf club; and actuating the groove forming tool from a first end to a second end of the golf club face.

Turning to the drawings, FIG. 1 illustrates a top view of golf club 100, according to a first embodiment. Golf club 100 is merely exemplary and is not limited to the embodiments presented herein. Golf club 100 can be employed in many different embodiments or examples not specifically depicted or described herein. Golf club 100 can be an iron-type golf club head, such as a 1-iron, a 2-iron, a 3-iron, a 4-iron, a 5-iron, a 6-iron, a 7-iron, an 8-iron, a 9-iron, a sand wedge, a lob wedge, a pitching wedge, an n-degree wedge (e.g., 44 degrees)(°, 48°, 52°, 56°, 60°, etc.), etc. In a different embodiment, golf club 100 can also be a wood-type golf club, a hybrid-type golf club, or a putter-type golf club.

In some embodiments, golf club 100 can include: (a) a golf club head 101; (b) a shaft 102; and (c) a hosel 103 coupled to shaft 102. In a different embodiment, golf club 100 has a hole, instead of hosel 103, to which shaft 102 is coupled. A first end of shaft 102 and hosel 103 may be secured to each other by an adhesive bonding process (e.g., epoxy) and/or other suitable bonding processes (e.g., mechanical bonding, soldering, welding, and/or brazing). To complete the golf club, a grip (not shown) may receive a second or opposite end of the shaft. The shaft and the grip may be secured to each other by an adhesive bonding process and/or other suitable bonding processes. In some examples, hosel 103 or the hole can be at the heel end of golf club head 101 or at a center of golf club head 101.

Golf club head 101 can include: (a) a club face 111 (i.e., a strike face) to engage a golf ball, (b) a sole 112 coupled to club face 111; (c) a toe edge 113 coupled to club face 111 and sole 112; (d) a heel edge 114 opposite toe edge 113 and coupled to club face 111 and sole 112; and (e) a top surface 115 (e.g., a top rail) coupled to club face 111, toe edge 113, and heel edge 114.

In some examples, golf club head 101 can be manufactured from a steel material, another metal, or one or more other materials by a casting process, a forging process, a combination thereof, or one or more other suitable manufacturing processes. In many examples, golf club head 101 can be formed as a unitary body. In other examples, golf club head 101 can be made of multiple pieces (e.g., a separate face plate and/or separate inserts to form the grooves).

Figure 2:
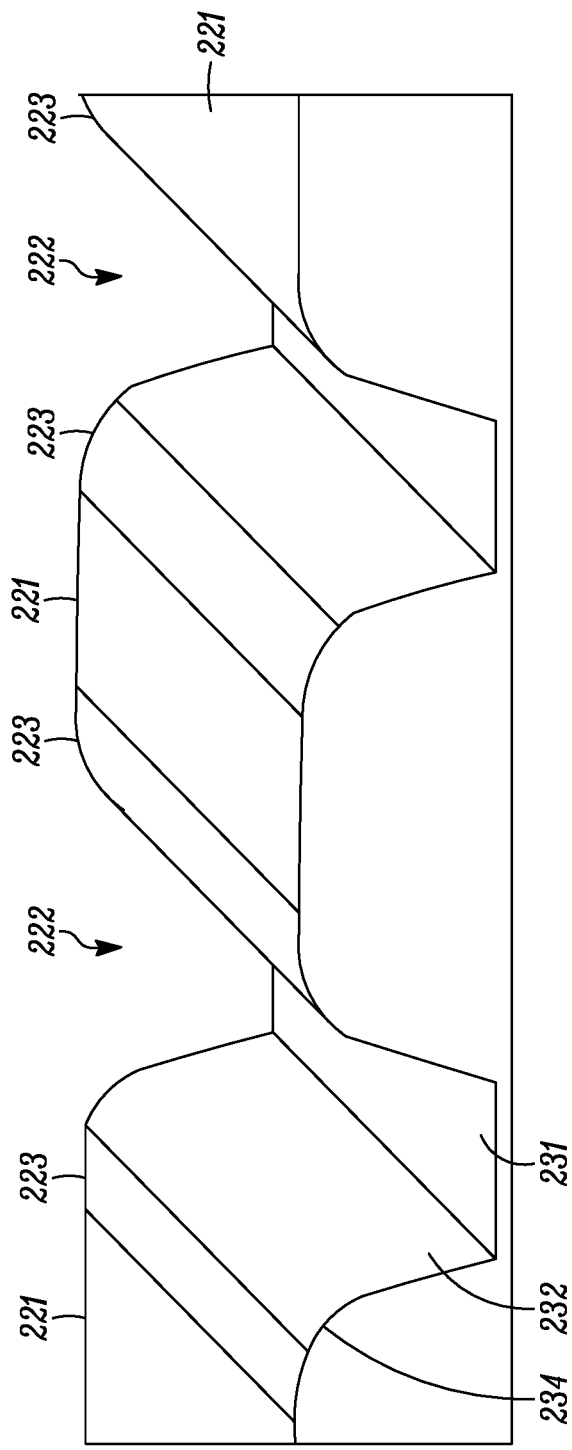
FIG. 2 illustrates an isometric cross-sectional view of a first part of the club face of the golf club of FIG. 1, according to the first embodiment.
Figure 3:
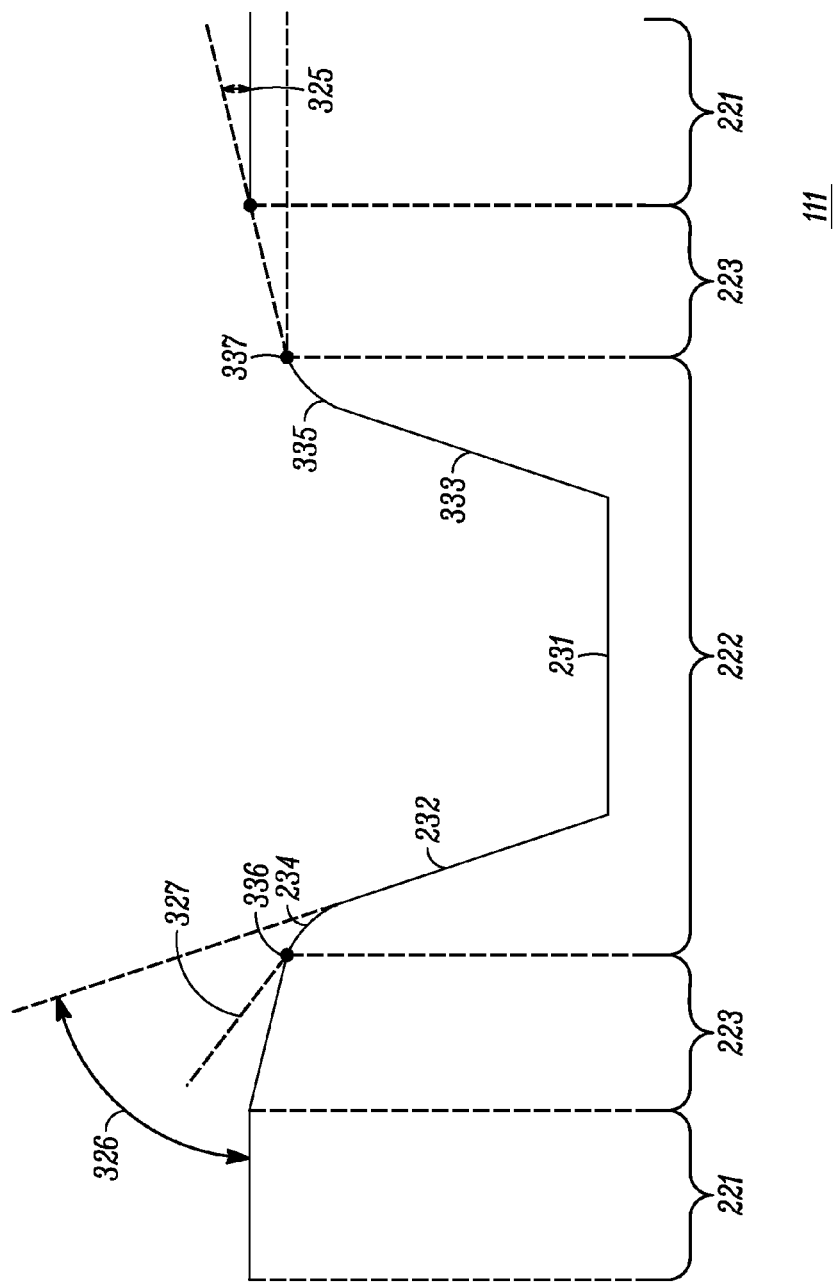
FIG. 3 illustrates a cross-sectional view of a second part of the club face of the golf club of FIG. 1, according to the first embodiment.

FIG. 2 illustrates an isometric cross-sectional view of a first part of club face 111, according to the first embodiment. FIG. 3 illustrates a cross-sectional view of a second part of club face 111, according to the first embodiment.

As shown in FIGS. 2 and 3, club face 111 can include: (a) a face portion 221; (b) at least one groove 222 (i.e., at least one channel); and (c) a second portion 223 (i.e., an angled surface) located between face portion 221 and groove 222. In various embodiments, face portion 221 is substantially flat. For example, the face portion can be substantially flat to within plus or minus approximately 0.002 inch (0.051 millimeters (mm)).

Groove 222 can include: (a) a bottom 231; (b) a first side wall 232 adjacent to bottom 231; (c) a second side wall 333 adjacent to bottom 231 and opposite first side wall 232; (d) a first top radius 234 adjacent to first side wall 232; and (e) a second top radius 335 adjacent to second side wall 333 and opposite first top radius 234. In addition, groove 222 can include a first thirty degree point 336 at a top end of first top radius 234 (i.e., between first top radius 234 and first side wall 232) and a second thirty degree point 337 at a top end of second top radius 335 (i.e., between second top radius 335 and second portion 223). First top radius 234 and second top radius 335 are 0.003 inch (0.75 mm) or closer from face portion 221. In some examples, the tangent lines (e.g., tangent line 327) at first thirty degree point 336 and second thirty degree point 337 of first top radius 234 and second top radius 335, respectively, are different from the slopes of first side wall 232 and second side wall 333, respectively.

In many examples, a distance between first thirty degree point 336 and second thirty degree point 337 is equal to or less than 0.035 inch (0.89 mm). In many examples, each of grooves 222 are symmetric. In many examples, first top radius 234 and/or first thirty degree point 336 can be considered part of first side wall 232. Similarly, second top radius 335 and/or second thirty degree point 337 can be considered part of first side wall 333.

In many examples, first thirty degree point 336 and second thirty degree point 337 are defined by and compliant with the USGA's thirty degree method for measuring groove width (the "Thirty Degree Rule"). The USGA's Determination of Groove Conformance (Impact Area Markings (App II, 5c) Measurement Procedure) ruling, dated August 2008, is incorporated herein by reference. According to the USGA in its Thirty Degree Rule (i.e., Appendix B of the Determination of Groove Conformance ruling), the groove in a club face starts where there is a significant departure from the plane of the face (land area) (i.e., face portion 221). The Thirty Degree Rule specifies where the measurement of the groove width should be taken when the edges of the grooves are rounded.

The sidewall of a groove generally meets the face of the club (land area) with a filleted transition. As shown in FIG. 4, under the Thirty Degree Rule, the groove width measurement (W) is made between two points where a line, inclined at thirty degrees to the land area of the club face, is tangent to the edge of the groove. Furthermore, as shown in FIG. 5, if the tangent point using the 30° method occurs at a location that is more than 0.003 in. (0.76 mm) below the land area, then the width measurement shall be made at the points on the groove that are 0.003 in. (0.76 mm) below the land area. FIGS. 4 and 5 are figures from the USGA Rules of Golf that help define the Thirty Degree Rule.

Accordingly, referring again to FIGS. 1-3, first thirty degree point 336 and second thirty degree point 337 are the points in groove 222 where a line, inclined at thirty degrees to face portion 221 of club face 111, is tangent to the edge of groove 222.

Second portion 223 can be located between face portion 221 and a top of groove 222. Second portion 223 can be a substantially flat plane at a first angle 325 with face portion 221. In some examples, first angle 325 is between approximately eight and eighteen degrees relative to face portion 221. In other examples, first angle 325 is between approximately ten and fifteen degrees relative to face portion 221. In still further examples, first angle 325 is approximately ten to eighteen degrees relative to face portion 221. These ranges can maximize visual appearance of the width of the grooves, while not being adversely affected by manufacturing tolerances. In some examples, a length of second portion 223 between face portion 221 and groove 222 can between approximately 0.002 inch (0.005 centimeters) and 0.047 inch (0.119 centimeters).

In some examples, first side wall 232 (or, in other examples, first top radius 234) is at a second angle 326 with face portion 221. Second angle 326 is greater than first angle 325.

Second portion 223 can be adjacent to first top radius 234 and second top radius 335 of groove 222. Specifically, second portion 223 can be adjacent to first top radius 234 at first thirty degree point 336 and second top radius 335 at second thirty degree point 337. Thus, second portion 223 is outside of groove 222, as defined by the Thirty Degree Rule.

In many examples, second portion 223 can be formed as a flat plane, tangent to first and second top radii 336 and 337 of groove 222. To be conforming to the USGA rules of golf, second portion 223 must be tangent to the top radius of groove 222, and at no more than thirty degrees when measured from face portion 221 of club face 111. In other examples, second portion 223 is not planar, For example, second portion 223 could consist of a larger radius than side walls 232 and 333 and/or top radius 234 and 335. This larger radius of second portion 223 would extend outside of groove 222 from top radius 234 and 335, providing the larger visual width for groove 222. In order for the larger radius to be conforming to the USGA standards, it can start at first thirty degree point 336 and second thirty degree point 337.

Figure 6:
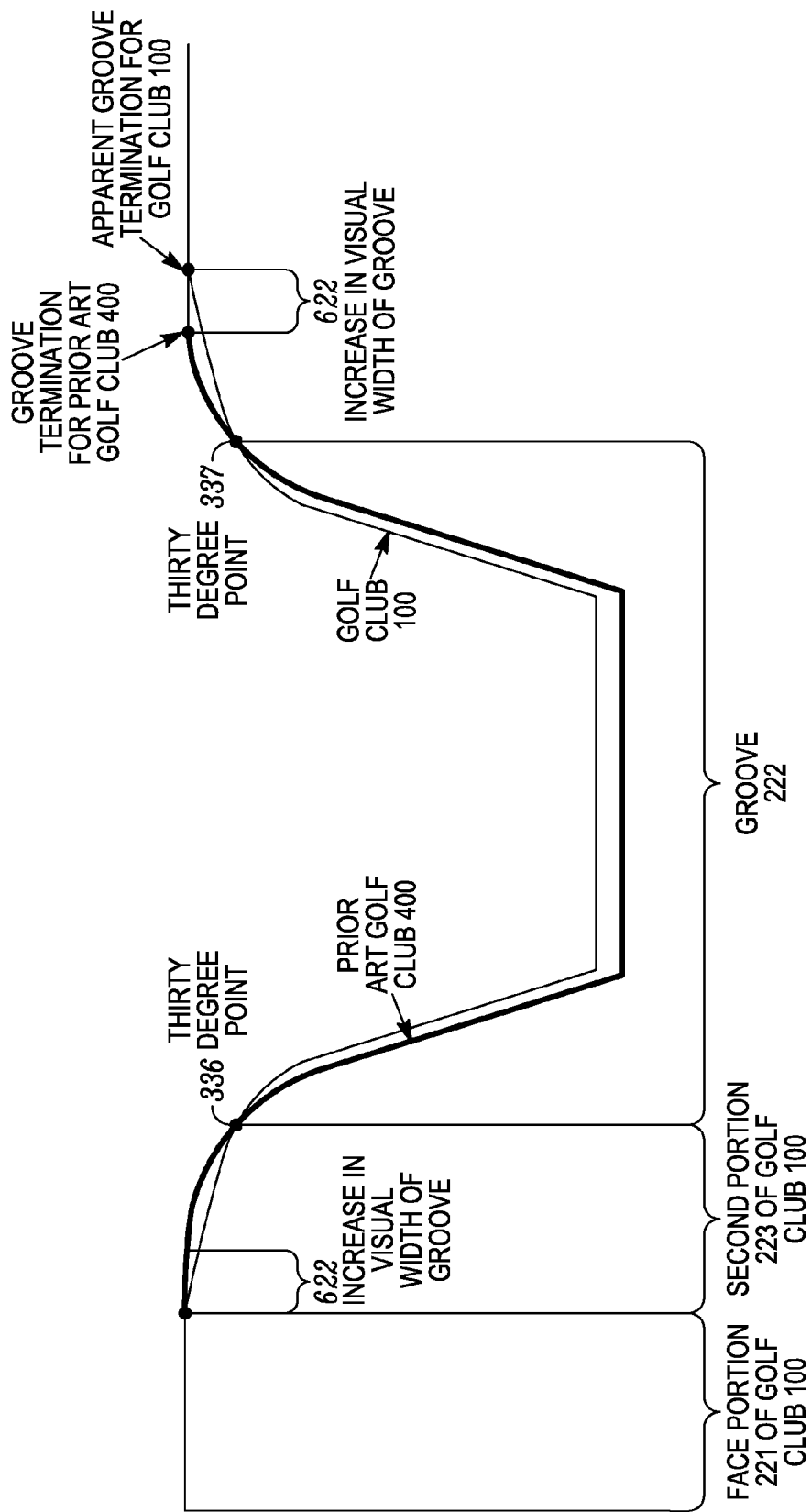
FIG. 6 illustrates an example of a cross-sectional view of the second part of club face of the golf club of FIG. 1 superimposed over a part of a prior art club face.

FIG. 6 illustrates an example of a cross-sectional view of the second part of club face 111 superimposed over a part of a prior art club face. As shown in FIG. 6, the use of second portion 223 in addition to groove 222 can create a visual impression to the user of golf club 100 that grooves 222 are larger than prior art grooves by amount 622 while golf club 100 and grooves 222 still comply with the USGA Rules of Golf. Accordingly, because many people associate larger or wider grooves with increased spin at ball impact and also with longer distances after impact, use of golf club 100 can provide an increased psychological benefit to its users and allow the user to hit a golf ball further and with improved accuracy.

Figure 7:
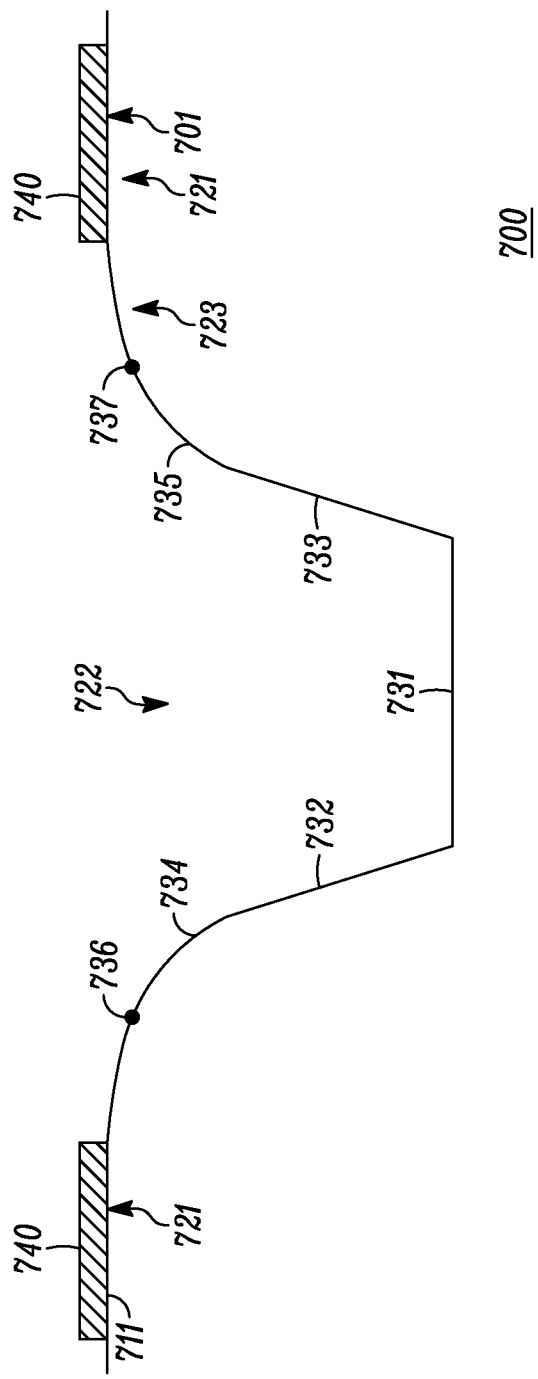
FIG. 7 illustrates a cross-sectional view of a second portion of a club face of a golf club, according to a second embodiment.

Turning to the drawings, FIG. 7 illustrates a cross-sectional view of a second portion of club face 711 of golf club 700, according to a second embodiment. Golf club 700 is merely exemplary and is not limited to the embodiments presented herein. Golf club 700 can be employed in many different embodiments or examples not specifically depicted or described herein. Golf club 700 can be an iron-type golf club head, such as a 1-iron, a 2-iron, a 3-iron, a 4-iron, a 5-iron, a 6-iron, a 7-iron, an 8-iron, a 9-iron, a sand wedge, a lob wedge, a pitching wedge, an n-degree wedge (e.g., 44 degrees)(°, 48°, 52°, 56°, 60°, etc.), etc. In a different embodiment, golf club 700 can also be a wood-type golf club, a hybrid-type golf club, or a putter-type golf club.

In some embodiments, golf club 700 can include: (a) a golf club head 701; (b) a shaft 102 (FIG. 1); and (c) a hosel 103 (FIG. 1) coupled to shaft 102. Golf club head 701 can include: (a) club face 711 (i.e., a strike face) to engage a golf ball, (b) a sole 112 (FIG. 1) coupled to club face 711; (c) a toe edge 113 (FIG. 1) coupled to club face 711 and sole 112; (d) a heel edge 114 (FIG. 1) opposite toe edge 113 and coupled to club face 711 and sole 112; (e) a top surface 115 (FIG. 1) (e.g., a top rail) coupled to club face 711, toe edge 113, and heel edge 114.

As shown in FIG. 7, club face 711 can include: (a) a face portion 721; (b) at least one groove 722; (c) a second portion 723 located between face portion 721 and groove 722; and (d) a cover layer 740 (i.e., a coating) located over at least a portion of face portion 721.

In various embodiments, face portion 221 is substantially flat. For example, face portion 721 can be substantially flat to within plus or minus approximately 0.002 inch (0.051 mm).

Groove 722 can include: (a) a bottom 731; (b) a first side wall 732 adjacent to bottom 731; (c) a second side wall 733 adjacent to bottom 731; (d) a first top radius 734 adjacent to first side wall 732; and (e) a second top radius 735 adjacent to second side wall 733. In addition, groove 722 can include a first thirty degree point 736 at an end of first top radius 734 and a second thirty degree point 737 at an end of second top radius 735. As shown in FIG. 7, groove 722 is devoid of cover layer 740 at second portion 723 and within groove 722. In other examples, groove 722 and second portion 723 can have a cover layer that is the same or different from cover layer 740.

In many examples, a thickness of cover layer 740 is less than 0.001 inch (0.025 mm). In some embodiments, a surface roughness and/or reflectivity of cover layer 740 is different than a surface roughness and/or reflectivity of second portion 723 and/or at least one surface of groove 722. For example, the surface roughness of cover layer 740 can be approximately 20 micro-inches (51 micro-centimeters) to 180 micro-inches (457 micro-centimeters), and the surface roughness of second portion 723 and groove 722 can be approximately 4 micro-inches (10 micro-centimeters), to 40 micro-inches (457 micro-centimeters), In the same or different examples, a surface of groove 722 and/or second portion 723 has a first reflectivity, and a surface of face portion 721 can have a second reflectivity. The first reflectivity is different from the second reflectivity. In many embodiments, cover layer 740 can be considered a surface of face portion 721 with cover layer 740 having the second reflectivity.

As shown in FIG. 7, golf club 700 is comprised of a contrasting finish, and a lead-in design for the grooves. The lead-in design, combined with the contrasting finish, creates an exaggerated "visual width" of the grooves, while the grooves remain entirely conforming to the USGA groove rules.

The contrasting finish is made up of a first finish (i.e., the lack of cover layer 740) and a "second finish" (i.e., cover layer 740) on club face 711. To manufacture golf club 700, the golf club head is forged or cast without the grooves in club face 711. After several smoothing steps, the golf club head possesses the natural finish of the metal, which is the first finish. Then a coating, or otherwise contrasting second finish, is placed on the golf club head. This contrasting second finish could be a plating, thin film coating, oxidation process, blasting process, or any other method that can, in some examples, create a resilient and thin coating. In many examples, the second finish is a contrasting finish when compared to the first finish that is created on the substrate club head material after the grooves have been machined or otherwise created. The contrasting second finish (i.e., cover layer 740) can be very thin to facilitate the milling of the lead-in design (in some examples, less than 0.001 in. (0.025 mm) thick). Some examples of contrasting finishes are: black-nickel chrome, dark-colored physical vapor deposition (PVD), QPQ (quench polish quench), oil can, satin nickel-chrome, steel shot bead blasting, or ceramic media blasting.

Figure 8:
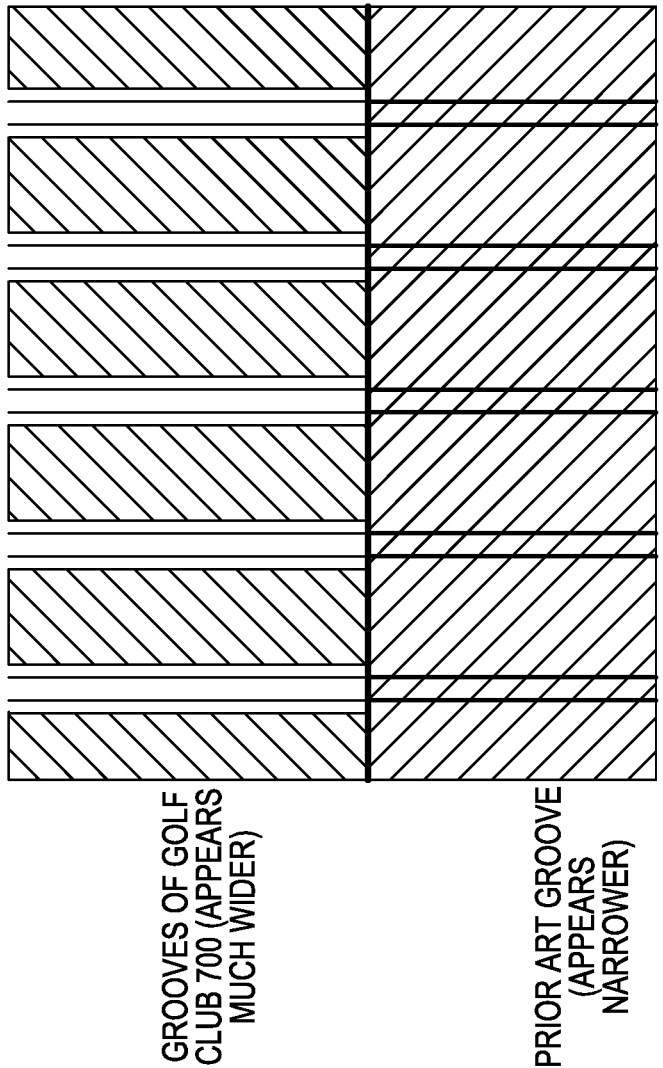
FIG. 8 illustrates a comparison of the grooves of the golf club of FIG. 7 with the groove of a prior art golf club.

Referring to FIG. 8, a golf club with a first and second finish and the lead-in groove design is shown side-by-side with a standard finish and standard grooves. In this embodiment, the grooves of golf club 700 appear to be 20% wider than the grooves in the prior art golf club.

Returning to FIG. 7, in other embodiments, cover layer 740 can be located over face portion 721 and over second portion 723, but not over grooves 722. In still another example, a first cover layer can be located over face portion 721, and a second cover layer can be located over second portion 723. In this embodiment, a third cover layer can be located over at least part of groove 722, or groove 722 can be devoid of a cover layer. In these examples, the first cover layer, the second cover layer, and the third cover layer can have different surface roughnesses and/or reflectivities. That is, the first cover layer, the second cover layer, and the third cover layer can be contrasting finishes.

Figure 9:
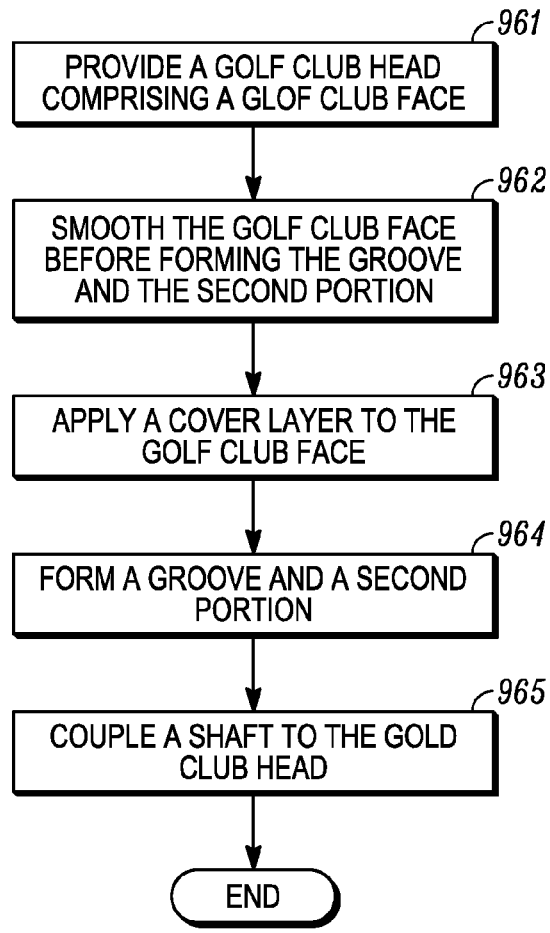
FIG. 9 illustrates a flow chart for an exemplary embodiment of a method of manufacturing a golf club, according to an embodiment.

FIG. 9 illustrates a flow chart for an embodiment of a method 900 of manufacturing a golf club. Method 900 is merely exemplary and is not limited to the embodiments presented herein. Method 900 can be employed in many different embodiments or examples not specifically depicted or described herein. In some embodiments, the activities, the procedures, and/or the processes of method 900 can be performed in the order presented. In other embodiments, the activities, the procedures, and/or the processes of method 900 can be performed in any other suitable order. In still other embodiments, one or more of the activities, the procedures, and/or the processes in method 900 can be combined or skipped.

Referring to FIG. 9, method 900 includes an activity 961 of providing a golf club head. For example, the golf club head can be similar or identical to golf club head 101 or 701 of FIGS. 1 and 7, respectively. For example, the golf club head body may be formed, for instance, by casting, forging, cutting, grinding, machining, welding, a combination thereof, or the like.

In some embodiments, the golf club head can have a face member, a sole, a toe edge coupled to the face member and the sole, a heel edge coupled to the face member and sole and opposite the toe edge, and a top surface coupled to the toe edge.

Method 900 in FIG. 9 continues with an activity 962 of smoothing the golf club face. In some examples, activity 962 can include performing tumbling, grinding, and/or polishing procedures to the golf club face. In many examples, after activity 962, the golf club face can be very smooth, and the natural finish of the metal of the golf club head can be exposed.

Subsequently, method 900 of FIG. 9 includes an activity 963 of applying a cover layer to the golf club face. In some examples, the cover layer can be similar to or the same as cover layer 740 of FIG. 7.

In some examples, the cover layer can be applied using plating, thin film coating, oxidation process, blasting process, or any other method that can create, in some examples, a resilient and thin coating. In various embodiments, the cover layer can be very thin to facilitate the milling of the lead-in design (in some examples less than 0.001 in. (0.025 mm) thick). Some examples of contrasting finishes are: black-nickel chrome, dark-colored physical vapor deposition (PVD), QPQ (quench polish quench), oil can, satin nickel-chrome, steel shot bead blasting, ceramic media blasting. In other embodiments, method 900 does not include an activity 963, and accordingly, no cover layer is applied to the golf club head.

Figure 10:
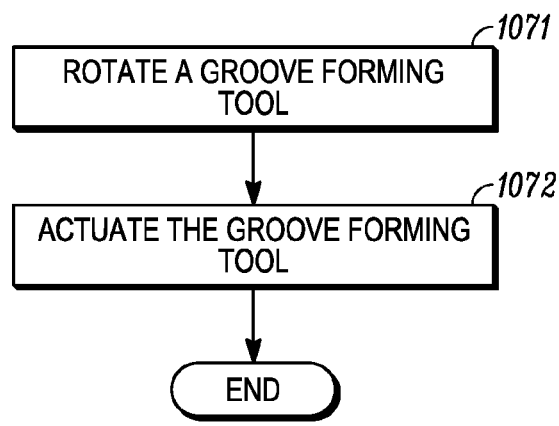
FIG. 10 illustrates a flow chart for an exemplary embodiment of an activity of forming a groove and a second portion at the golf club face, according to an embodiment.

Next, method 900 of FIG. 9 includes an activity 964 of forming a groove and a second portion at the golf club face. In some examples, the groove can be similar to or the same as groove 222 or 722 of FIGS. 2 and 7, respectively. The second portion can be similar to or the same as second portion 223 or 723 of FIGS. 2 and 7, respectively. FIG. 10 illustrates a flow chart for an exemplary embodiment of activity 964 of forming a groove and a second portion at the golf club face, according to the first embodiment.

Referring to FIG. 10, activity 964 includes a procedure 1071 of rotating a groove forming tool. In some examples, the groove forming tool can be rotated such that the groove forming tool forms the groove in the golf club face such that the groove is compliant with the Thirty Degree Rule when measured from a first top radius of the groove and a second top radius of the groove. The second portion is adjacent to the first and second top radius of the groove and has a first angle of approximately eight to eighteen degrees relative to a face portion of the golf club.

In various embodiments, procedure 1071 involves rotating the groove forming tool such that the groove forming tool forms the groove in the golf club face so that a distance between the first thirty degree point and the second thirty degree point is equal to or less than 0.035 in (0.89 mm).

Figure 11:
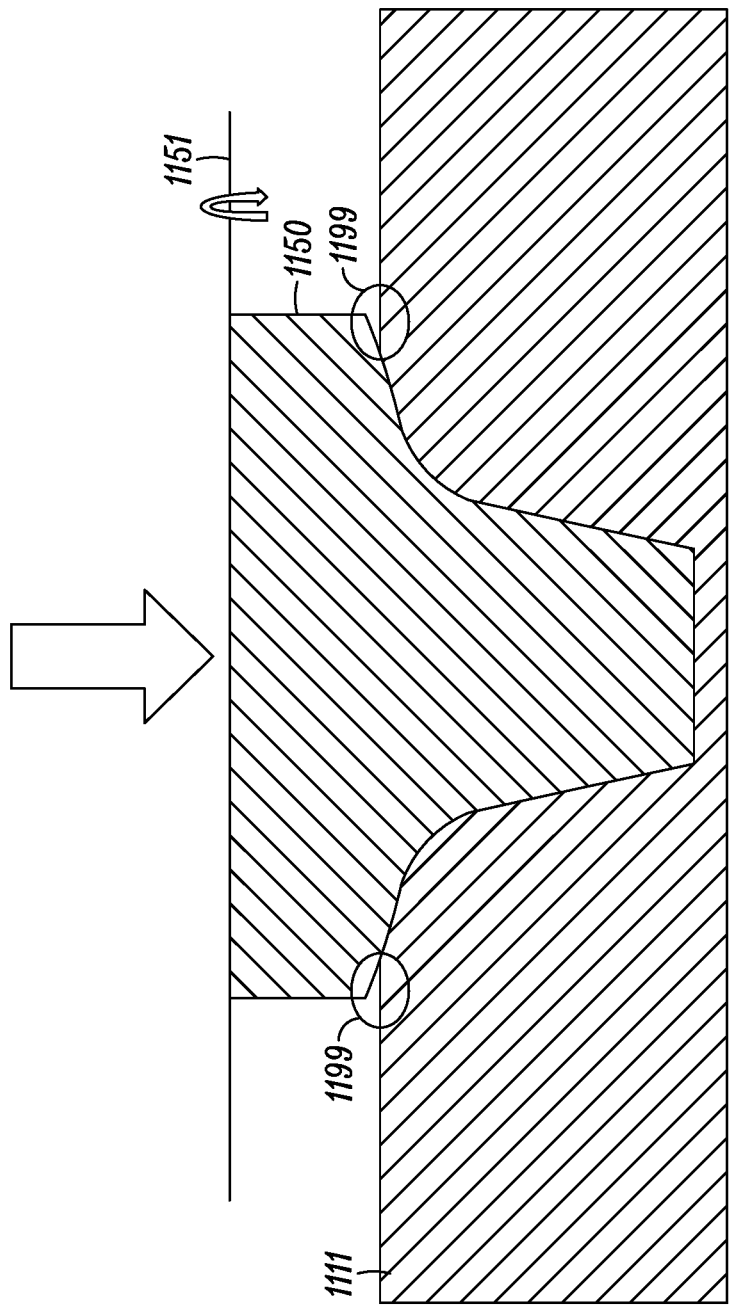
FIG. 11 illustrates an example of a groove cutting tool forming a groove.

At least three different embodiments can be used to rotate the groove forming tool. A first example of a groove forming tool 1150 rotating to form the groove is illustrated in FIG. 11. FIG. 11 illustrates a cross section of a lead-in design groove, with the wheel cutter bit inserted into the groove. In this example, grove forming tool 1150 can be a wheel cutter. In this embodiment, a bit spins about an axis 1151 that is parallel to face portion 111. As the bit spins, it scoops out material, creating the lead-in design. The design of the bit creates a conforming groove, while keeping a noticeable visual width. In order to machine a conforming and consistent design, the manufacturing tolerances must be taken into account. When the wheel cutter is lowered into the face portion, the machine's limitations can create a range of plunge depths. The design of the bit is such that the range of depths will minimally impact the look and conformity of the grooves.

FIG. 12 illustrates a table showing how the angle of the second portion can affect the impact of the mechanical limitations on the visual width of the groove. By optimizing the second portion's angle relative to the face portion, and taking the range of plunge depths into account, the bit can create consistent and conforming grooves. Referring to FIG.

11, a procedure to optimize the bit is shown schematically in circles 1199; the circles indicate an extended portion of the bit. The bit's extended portion reaches beyond the visual width specifications, while maintaining the same angle with the face portion. FIG. 11 also shows the axis of rotation 1151, and it demonstrates how the bit can be a virtually perfect negative, or opposite of, the lead-in design groove. The bit is lowered into the club face while spinning at a high rate. In this example, the groove forming tool is at an angle perpendicular to the golf club face.

In other embodiments, instead of machining the second portion of the club face at the same time as the main groove, the second portion could be machined into the club face in a secondary operation. Additional manufacturing methods include etching the second portion into the face of the clubs.

Figure 13:
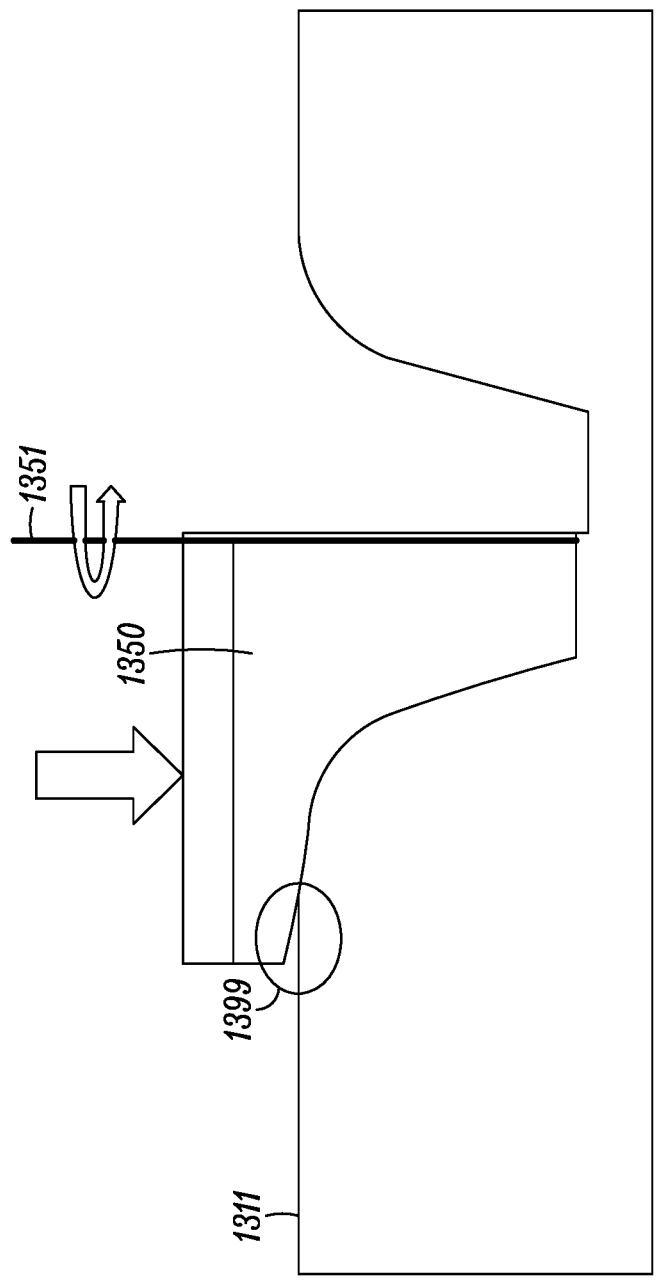
FIG. 13 illustrates a second example of a groove cutting tool forming a groove.

A second example of a groove forming tool rotating to form the groove in procedure 1071 of FIG. 10 is illustrated in FIG. 13. In the example shown in FIG. 13, groove forming tool 1350 can be a form cutter. In this embodiment, the form cutter spins about an axis 1351 that is perpendicular to face portion 1311 of the club head. As the bit spins, it extracts material under the same principle as an Archimedean Screw pump. A difference between the example in FIG. 11 and this example is the bit. In the example of FIG. 11, the bit is a full negative image of the lead-in groove's negative geometry. In this example of FIG. 13, the bit is a half negative image of the groove's geometry, and as it spins, the bit carves out mirror images of itself on either side of axis of rotation 1351.

In some examples, this example in FIG. 13 can suffer from the same plunge depth range as the first example. To circumvent this mechanical limitation, the bit can be designed with an extended portion, beyond the visual width design, as shown in circle 1399. This extended portion allows for the plunge depth range to minimally affect the appearance and the consistency of the grooves. In many examples, the bit can be lowered into the club face while spinning at a high rate.

A third method of manufacture for procedure 1071 combines at least one of the first example of FIG. 11 and the second example of FIG. 13 to carve out a substantially standard groove. Then, a secondary milling step is completed to create the second portion. The first and second examples of FIGS. 11 and 13 require only one milling pass, but it is possible to create the groove with a first milling step, then a second milling step to create the second portion. Other methods than the three described above also can be used to create the groove and the second portion.

Activity 964 in FIG. 10 continues with a procedure 1072 of actuating the groove forming tool at the angle from a first end to a second end of the golf club face. In many examples, the groove forming tool can be actuated from a first end of the face portion to a second end of the face portion to form a groove (or grooves). In many examples, procedures 1071 and 1072 can be repeated multiple times to create two or more grooves in the face portion. In other examples, the groove forming tool is designed to form more than one groove in a single pass. After procedure 1072, activity 964 is complete.

Referring back to FIG. 9, method 900 of FIG. 9 includes an activity 965 of coupling a shaft to the golf club head, wherein a hosel or a hole of the golf club head is configured to accept the shaft. In some examples, the hosel can be coupled to the golf club head body such that the golf club is similar or identical to golf club 100 or 700 of FIGS. 1 and 7, respectively.

Figure 14:
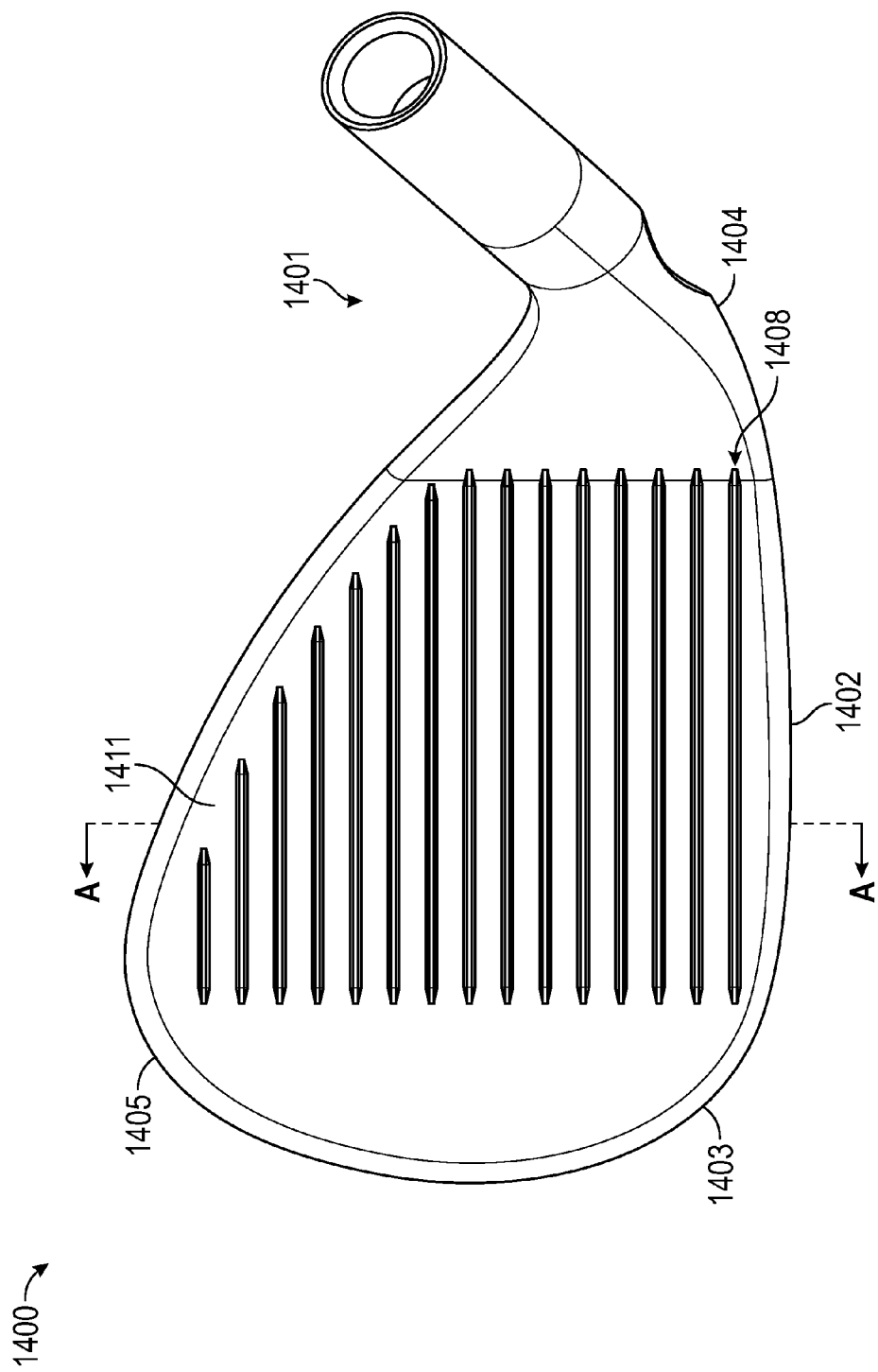
FIG. 14 illustrates a front view of another embodiment of a golf club head.
Figure 15:
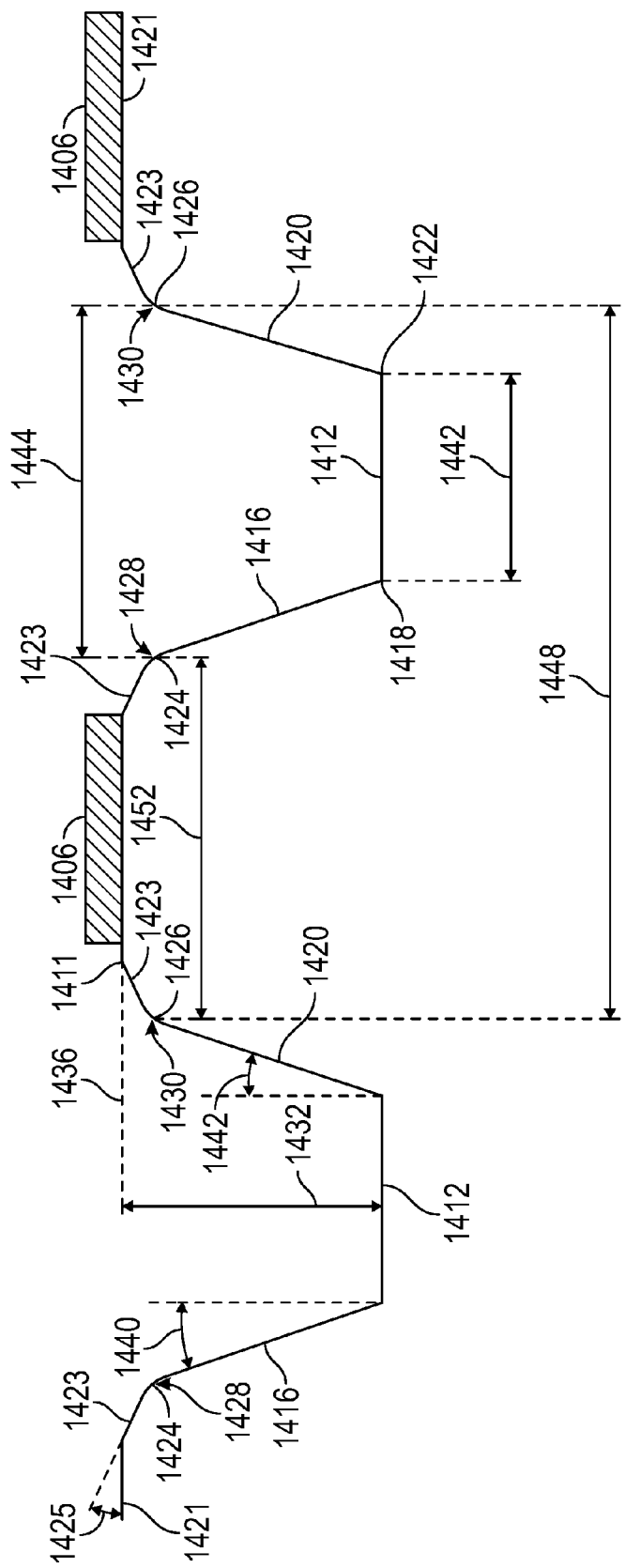
FIG. 15 illustrates a partial cross-sectional view of the face plate of the golf club head of FIG. 14 taken along line A-A.

FIGS. 14 and 15 illustrate another embodiment of a golf club 1400 having a golf club head 1401, which can be similar or identical to golf club head 101 and 701. Golf club head 1401 comprises a club face 1411 to engage a golf ball, a sole 1402, a toe edge 1403, a heel edge 1404 opposite the toe edge 1403, and a top rail 1405.

The club face 1411 of the golf club head 1401 can comprise of a plurality of grooves 1408 (e.g. at least 1 groove 1408, at least 5 grooves 1408, at least 10 grooves 1408, at least 15 grooves 1408, at least 20 grooves 1408, or at least 25 grooves 1408), a face portion 1421, and a second portion 1423 similar or the same as second portion 223 or 723.

As illustrated in FIG. 15, the plurality of grooves 1408 (i.e. the grooves 1408) comprises a bottom 1412, a first side wall 1416 adjacent to the bottom 1412, a second side wall 1420 adjacent to the bottom 1412 and opposite the first side wall 1416, a first top radius 1428 and a second top radius 1430 opposite from the first top radius 1428. Further, the grooves 1408 can comprise a depth 1432, a first side wall angle 1440, a second side wall angle 1442, a first top radius 1428, a second top radius 1430, a bottom width 1442, a top width 1444 opposite the bottom width 1442, and a pitch 1448.

In addition, the grooves 1408 can include a first thirty degree point 1424 at a top end of first top radius 1428 between the first top radius 1428 and the second portion 1423, and a second thirty degree point 1426 at a top end of second top radius 1430 between the second top radius 1430 and the second portion 1423. In some examples, the tangent lines (e.g., tangent line 1427) at first thirty degree point 1424 of the first top radius 1428, and second thirty degree point 1428 of the second top radius 1430, respectively, are different from the slopes of first side wall 1416 and second side wall 1420, respectively.

The depth 1432 of the grooves 1408 can be measured perpendicular from the bottom 1412 of the grooves 1408, to a projected plane 1436 that is co-planar with the club face 1411. The grooves 1408 can have a depth 1432 of approximately 0.001 inch to approximately 0.020 inch (i.e. approximately 0.001 inch, approximately 0.004 inch, approximately 0.008 inch, approximately 0.012 inch, approximately 0.016 inch, or approximately 0.020 inch).

The first side wall angle 1440 of the grooves 1408 can be measured as the angle from the first side wall 1416 to a plane perpendicular to the bottom 1412. Similarly, the second side wall angle 1442 of the grooves 1408 can be measured as the angle from the second side wall 1420 to the place perpendicular to the bottom 1412. The first side wall angle 1440 and the second side wall angle 1442 of the groove 1408 can range from approximately 0 degrees (approximately perpendicular to the bottom 1412) to up to approximately 45 degrees (i.e. approximately 0 degrees, up to approximately 5 degrees, up to approximately 10 degrees, up to approximately 15 degrees, up to approximately 20 degrees, up to approximately 25 degrees, up to approximately 30 degrees, up to approximately 35 degrees, up to approximately 40 degrees, or up to approximately 45 degrees).

The first top radius 1428 of the grooves 1408 has a first radius of curvature. Similarly the second top radius 1430 of the grooves 1408 has a second radius of curvature. The first and second top radius 1428 and 1430 inversely correlate to the first and second side wall angles 1440 and 1442 according to the USGA; as the first/second side wall angle 1440/1442 increases, the first/second top radius 1428/1430 decreases. Therefore, the range of the first/second top radius 1428 is dependent on the first/second side wall angle 1440/

1442. For example, with a first/second side wall angle 1440/1442 of approximately 0 degrees, the first/second top radius 1428/1430 can have a range of approximately 0.0093 inch to approximately 0.0108 inch, with a first/second side wall angle 1440/1442 of approximately 16 degrees, the first/second top radius 1428/1430 can have a range of approximately 0.0095 inch to approximately 0.0107 inch, or with a first/second side wall angle 1440/1442 of approximately 28 degrees, the first/second top radius 1428/1430 can have a range of approximately 0.0097 inch to approximately 0.0108 inch.

The bottom width 1442 of the grooves 1408 is measured from a first point 1418 adjacent the first side wall 1416 and the bottom 1412, to a second point 1422 adjacent the second side wall 1420 and the bottom 1416.

Referring to FIG. 15, the top width 1444 of the grooves 1408 can be measured from the first thirty degree point 1424 of the first side wall 1416 of one groove 1408, to the second thirty degree point 1426 of the second side wall 1420 of the same groove 1408. The face portion 1421 of the club face 1411 comprises a land width 1452. The land width 1452 of the club face 1404 is located between at least one groove 1408 and a second groove 1408. The land width 1452 is measured from a second thirty degree point 1426 of the at least one groove 1408 to a first thirty degree point 1424 of the second groove 1408. The pitch 1448 of the grooves 1408 is measured by the total length of the top width 1444 of the grooves 1408 and the land width 1452 of the face portion 1421. The ratio of a cross sectional area of the groove 1408 to the pitch 1448 of the groove 1408 must be at most approximately 0.003 in$^2$/in to maintain USGA regulations.

The second portion 1423 of the club face 1411 can be located between face portion 1421 and a top of groove 1408. The second portion 1423 can be a substantially flat plane at a first angle 1425 with face portion 1421. In some examples, first angle 1425 is between approximately eight and eighteen degrees relative to face portion 1421. In other examples, first angle 1425 is between approximately ten and fifteen degrees relative to face portion 1421. In still further examples, first angle 1425 is approximately ten to eighteen degrees relative to face portion 1421. These ranges can maximize visual appearance of the width of the grooves, while not being adversely affected by manufacturing tolerances. In some examples, a length of second portion 1423 between face portion 1421 and groove 1408 can between approximately 0.002 inch (0.005 centimeters) and 0.047 inch (0.119 centimeters). For example, the length of second portion can be 0.002 inch, 0.008 inch, 0.014 inch, 0.020 inch, 0.026 inch, 0.032 inch, 0.038 inch, 0.042 inch, or 0.047 inch.

Adjusting the above described groove parameters (i.e. depth 1432, first side wall angle 1440, second side wall angle 1442, first top radius 1428, second top radius 1430, bottom width 1442, top width 1444, and pitch 1448) of the club face 1411, can affect ball spin. Adjusting the groove parameters to increase ball spin can be desirable to golf clubs, specifically to high lofted wedges (e.g. wedges with loft angles approximately 56 degrees to approximately 60 degrees) that are used for partial shots. Increased spin can be achieved by decreasing pitch 1448, and/or decreasing the groove radius 1428. Adjustment of groove parameters is limited by USGA conformance rules, specifically the ratio of the groove area to the pitch of the groove to be less than or equal to 0.003 in$^2$/in. However, increasing or maximizing spin on a ball while maintaining USGA conformance of a groove area to pitch ratio to be less than or equal to 0.003 in$^2$/in can be accomplished in several ways.

A. Pitch and Cross Sectional Area

First, spin can be increased by decreasing the pitch 1448, while decreasing cross sectional area. Decreasing pitch 1448 increases the number of grooves 1408 on the strike face 1404, thus there are more grooves to grip onto the ball during impact to increase spin compared to similar golf club heads with greater pitch and reduced number of grooves. Decreasing cross sectional area allows for the ratio of the groove area to the pitch 1448 to be less than or equal to 0.003 in$^2$/in to be in compliance of USGA regulation. The decreased cross sectional area can be accomplished by adjusting one or more of the depth 1432, side wall angle 1440, bottom width 1442, and top width 1444. The first method of decreasing pitch 1448 while decreasing cross sectional area of a golf club head 1401 can increase the ball spin rate by at least 12%. For example, the ball spin rate ca increase at least 1%, at least 2%, at least 3%, at least 4%, at least 5%, at least 6%, at least 7%, at least 8%, at least 9%, at least 10%, at least 11% or at least 12% compared to a similar golf club head without decreased pitch and cross sectional area.

In this embodiment, using the first method of increasing the ball speed, the pitch 1448 of the grooves 1408 can range from up to approximately 0.094 inch-to up to approximately 0.154 inch, approximately 0.094 inch to approximately 0.110 inch, approximately 0.110 inch to approximately 0.125 inch, approximately 0.125 inch to approximately 0.135 inch, approximately 0.135 inch to approximately 0.145 inch, or approximately 0.145 inch to approximately 0.154 inch. For example, the pitch 1448 of the grooves 1408 can be approximately 0.094 inch, approximately 0.98 inch, approximately 0.102 inch, approximately 0.106 inch, approximately 0.110 inch, approximately 0.114 inch, approximately 0.118 inch, approximately 0.122 inch, approximately 0.126 inch, approximately 0.130 inch, approximately 0.134 inch, approximately 0.138 inch, approximately 0.142 inch, approximately 0.146 inch, approximately 0.150 inch, or approximately 0.154 inch. Further in this embodiment, the bottom width 1442 of the grooves 1408 can range from approximately 0.007 inch approximately 0.012 inch, approximately 0.007 inch to approximately 0.009 inch, approximately 0.009 inch to approximately 0.012 inch. For example, the bottom width 1442 of the grooves 1408 can be approximately 0.007 inch, approximately 0.0074 inch, approximately 0.0078 inch, approximately 0.0082 inch, approximately 0.0086 inch, approximately 0.0090 inch, approximately 0.0094 inch, approximately 0.0098 inch, approximately 0.010 inch, or approximately 0.012 inch. Further still in this embodiment, the depth 1432 of the grooves 1408 can range from approximately 0.011 inch to approximately 0.021 inch, approximately 0.011 inch to approximately 0.015 inch, or approximately 0.015 inch to approximately 0.021 inch. For example, the depth 1332 of the grooves 1408 can be approximately 0.011 inch, approximately 0.013 inch, approximately 0.015 inch, approximately 0.017 inch, approximately 0.019 inch, or approximately 0.021 inch.

In one example, a golf club head 1401 produced a ball spin rate increase of up to 12% from a decreased pitch 1448 and decreased width 1412 (while maintaining USGA conformance of the ratio of the groove area to the pitch 1448 to be less than or equal to 0.003 in$^2$/in), compared to a similar golf club head without a decreased pitch and cross sectional area. The golf club head 1401 with the ball spin rate increase of up to 12% comprised grooves 1408 having a pitch 1448 of approximately 0.118 inch, a bottom width 1412 of approximately 0.010 inch, a depth 1432 of approximately 0.018 inch, a first and second side wall angle 1440 and 1442 of 28 degrees, and a first and second top radius 1428 and 1430 of 0.004 inch, achieved a ball spin rate of 9938 rpm. While the similar golf club head without a decreased pitch and decreased width (also within USGA conformance of the ratio of the groove area to the pitch to be less than or equal to 0.003 in$^2$/in), comprised grooves having a pitch of 0.133 inch, a bottom width of 0.0138 inch, a depth of 0.0165 inch, a first and second side wall angle 1440 and 1442 of 24 degrees, and a first and second top radius 1428 and 1430 of 0.0045 inch, achieved a ball spin rate of 9590. This example decreases the pitch 1448 and the width 1412 to increase the ball spin speed while maintaining the ratio of the groove area to the pitch 1448 to be less than or equal to 0.003 in$^2$/in.

B. Groove Radius and Side Wall Angle

Second, ball spin can be increased while maintaining USGA conformance of the ratio of the groove area to the pitch 1448 to be less than or equal to 0.003 in$^2$/in by reducing the first and second groove radii 1428 and 1430 and depth 1432, while increasing the first and second side wall angle 1440 and 1442. Reducing the first and second groove radii 1428 and 1430 while increasing the first and second side wall angles 1440 and 1442 allows for the grooves 1408 to have a wider contact point to grip the ball during impact and increase the spin of the ball. Decreasing the depth 1432 of the groove allows for the ratio of the groove area to the pitch 1448 to be less than or equal to 0.003 in$^2$/in to be in compliance of USGA regulation. The second method of decreasing the first and second groove radii 1428 and 1430 while increasing the first and second side wall angle 1440 and 1442 of a golf club head 1401 can increase the ball spin rate by at least 12%. For example, the ball spin rate can increase at least 1%, at least 2%, at least 3%, at least 4%, at least 6%, at least 7%, at least 8%, at least 9%, at least 10%, at least 11% or at least 12% compared to a similar golf club head without decreased first and second groove radii and increased first and second side wall angle while maintaining USGA conformance of the ratio of the groove area to the pitch 1448 to be less than or equal to 0.003 in$^2$/in.

In this embodiment, using the second method of increasing ball speed, the first and second side wall angle 1440 and 1442 of the grooves 1408 can range from approximately 16 degrees to approximately 30 degrees, from approximately 16 degrees to approximately 20 degrees, from approximately 20 degrees to approximately 25 degrees, or from approximately 25 degrees to approximately 30 degrees). For example, the first and second side wall angle 1440 and 1442 of the grooves 1408 can be approximately 16 degrees, up to approximately 18 degrees, up to approximately 20 degrees, up to approximately 22 degrees, up to approximately 24 degrees, up to approximately 26 degrees, up to approximately 28 degrees, or up to approximately 30 degrees). Further in this embodiment, the first and second top radii 1428 and 1430 of the grooves 1408 can range from approximately 0.0032 inch approximately 0.0060 inch, from approximately 0.0032 inch to approximately 0.0038 inch, from approximately 0.0038 inch to approximately 0.0044 inch, from approximately 0.0044 inch to approximately 0.0050 inch, from approximately 0.0050 inch to approximately 0.0056 inch, or from approximately 0.0056 inch to approximately 0.0060 inch. For example, the first and second top radii 1428 and 1430 of the grooves 1408 can be approximately 0.0032 inch, up to approximately 0.0035 inch, up to approximately 0.0040 inch, up to approximately 0.0045 inch, up to approximately 0.0050 inch, up to approximately 0.0055 inch, or up to approximately 0.0060 inch. Further still in this embodiment, the depth 1432 of the grooves 1408 can range from approximately 0.011 inch to approximately 0.021 inch, approximately 0.011 inch to approximately 0.015 inch, or approximately 0.015 inch to approximately 0.021 inch. For example, the depth 1332 of the grooves 1408 can be approximately 0.011 inch, approximately 0.013 inch, approximately 0.015 inch, approximately 0.017 inch, approximately 0.019 inch, or approximately 0.021 inch.

In one example, a golf club head 1401 produced an increased ball spin rate of approximately 3.6% from a decreased first/second top radius 1428/1430 and depth 1432 and increased first/second side wall angle 1440/1442 (while maintaining USGA conformance of the ratio of the groove area to the pitch 1448 to be less than or equal to 0.003 in$^2$/in), compared to a similar golf club head without decreased top radius and depth and increased side wall angle. The golf club head 1401 with the ball spin rate increase of approximately 3.7%, comprised grooves having a first/second top radius 1428/1430 of 0.004 inch, a depth 1432 of 0.0175 inch, a first/second sidewall angle 1440/1442 of 28 degrees, a pitch 1448 of 0.118 inch, and a bottom width 1442 of 0.0096 inch achieved a ball spin rate of up to 9938 rpm. The similar golf club head without decreased top radius and depth and increased side wall angle (also within USGA conformance of the ratio of the groove area to the pitch to be less than or equal to 0.003 in$^2$/in), comprised grooves having a first and second top radii of 0.0045 inch, a depth of 0.014 inch, a first and second side wall of 24 degrees, a pitch of 0.118 inch, and a bottom with of 0.016 inch achieved a ball spin rate of 9590 rpm. This example increases the ball spin rate while maintaining USGA conformance of the ratio of the groove area to the pitch 1448 to be less than or equal to 0.003 in$^2$/in by reducing the first and second groove top radii 1428 and 1430 and the depth 1432, while increases the first and second side wall angle 1440 and 1442.

In another example, a golf club head 1401 with a loft of 56 degrees to 60 degrees comprise grooves 1408 having a first and a second side wall angle 1440 and 1442 of approximately 24 degrees, and a first and a second groove top radii 1428 and 1430 of approximately 0.0045 inch. Further, the grooves 1408 having a pitch 1448 of approximately 0.118 inch, a bottom width 1442 of approximately 0.016 inch, and a depth 1432 of approximately 0.014 inch.

C. Coating

The golf club head 1401 can further comprise a cover layer 1406 (i.e., a coating) located over at least a portion of club face 1411. In some embodiments, the grooves 1408 are devoid of the coating 1406 and in other embodiments, the grooves 1408 contain the coating 1406. The coating 1406 creates a contrasting second finish on the golf club head 1401. This contrasting second finish could be a plating, thin film coating, oxidation process, blasting process, or any other method that can, in some examples, create a resilient and thin coating. In many examples, the second finish is a contrasting finish when compared to the first finish that is created on the substrate club head material after the grooves have been machined or otherwise created. The contrasting second finish (i.e., cover layer 1406) can be very thin to facilitate the milling of the lead-in design (in some examples, less than 0.001 in. (0.025 mm) thick). Some examples of contrasting finishes are: black-nickel chrome, dark-colored physical vapor deposition (PVD), QPQ (quench polish quench), oil can, satin nickel-chrome, steel shot bead blasting, or ceramic media blasting.

In many examples, a thickness of cover layer 1406 is less than 0.001 inch (0.025 mm). In some embodiments, a surface roughness and/or reflectivity of cover layer 1406 is different than a surface roughness and/or reflectivity of at least one surface of groove 1408. For example, the surface roughness of cover layer 1406 can be approximately 20 micro-inches (51 micro-centimeters) to 180 micro-inches (457 micro-centimeters), 20 micro-inches (51 micro-centimeters) to 50 micro-inches (127 micro-centimeters), 50 micro-inches (127 micro-centimeters) to 80 micro-inches (203 micro-centimeters), 80 micro-inches (203 micro-centimeters) to 110 micro-inches (280 micro-centimeters), 110 micro-inches (280 micro-centimeters) to 140 micro-inches (356 micro-centimeters), or 140 micro-inches (356 micro-centimeters) to 180 (457 micro-centimeters) micro-inches; and the surface roughness of groove 722 can be approximately 4 micro-inches (10 micro-centimeters) to 40 micro-inches (102 micro-centimeters), 4 micro-inches (10 micro-centimeters) to 10 micro-inches (25 micro-centimeters), 10 micro-inches (25 micro-centimeters) to 20 micro-inches (51 micro-centimeters), 20 micro-inches (51 micro-centimeters) to 30 micro-inches (76 micro-centimeters), or 30 micro-inches (76 micro-centimeters) to 40 micro-inches (102 micro-centimeters).

In the same or different examples, a surface of groove 1408 has a first reflectivity, and a surface of the club face 1411 can have a second reflectivity. The first reflectivity is different from the second reflectivity. In many embodiments, cover layer 1406 can be considered a surface of club face 1411 with cover layer 1406 having the second reflectivity.

In some examples, golf club head 1401 can be manufactured from a steel material, another metal, or one or more other materials by a casting process, a forging process, a combination thereof, or one or more other suitable manufacturing processes. In many examples, golf club head 1401 can be formed as a unitary body. In other examples, golf club head 1401 can be made of multiple pieces (e.g., a separate face plate and/or separate inserts to form the grooves).

As the rules of golf may change from time to time (e.g., new regulations may be adopted or old rules may be eliminated or modified by golf standard organizations and/or governing bodies), golf equipment related to the methods, apparatus, and/or articles of manufacture described herein may be conforming or non-conforming to the rules of golf at any particular time. Accordingly, golf equipment related to the methods, apparatus, and/or articles of manufacture described herein may be advertised, offered for sale, and/or sold as conforming or non-conforming golf equipment. The methods, apparatus, and/or articles of manufacture described herein are not limited in this regard, unless expressly stated otherwise.

As explained previously, while the above examples may be described in connection with an iron-type golf club, the apparatus, methods, and articles of manufacture described herein may be applicable to other types of golf club, such as a fairway wood-type golf club, a hybrid-type golf club, an iron-type golf club, a wedge-type golf club, a putter-type golf club, or a driver-type golf club. In other embodiments, the apparatus, methods, and articles of manufacture described herein may be applicable to other type of sports equipment, such as a hockey stick, a tennis racket, a fishing pole, a ski pole, etc.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 961-965 of FIG. 9 and procedures 1071 and 1072 of FIG. 10 may be comprised of many different activities and procedures and performed by many different modules, in many different orders; that any element of FIG. 1 may be modified; and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A golf club head comprising:
    a club face comprising:
        a loft;
        a face portion;
        at least one groove in the club face, the at least one groove having a bottom with a bottom width ranging between approximately 0.009 inch to approximately 0.012 inch, a first side wall adjacent to the bottom, a second side wall adjacent to the bottom, a first groove radius adjacent to the first side wall, and a second groove radius adjacent to the second side wall;
        a land width adjacent to a first top radius of the at least one groove and a second top radius of a second groove;
        a pitch of the at least one groove ranging between approximately 0.110 inch and approximately 0.125 inch;
        a depth of the at least one groove ranging between approximately 0.015 inch and approximately 0.021 inch; and
        a second portion located between the face portion and one of the first top radius or the second top radius, the second portion is a substantially flat plane at a first angle with the face portion and has a length of between approximately 0.002 inch and 0.047 inch;
    wherein:
        the first angle is between approximately eight and eighteen degrees relative to the face portion; and
        the at least one groove is compliant with a Thirty Degree Rule when measured from the first top radius and the second top radius.

2. The golf club head of claim 1, further comprising a loft of the club face ranging between 56 degrees and 60 degrees.

3. The golf club head of claim 1, wherein:
    the pitch of the at least one groove is 0.118 inch.

4. The golf club head of claim 1, wherein:
    the bottom width of the at least one groove is 0.010 inch.

5. The golf club head of claim 1, wherein:
    the depth of the at least one groove is 0.018 inch.

6. The golf club head of claim 1, wherein:
    a surface of the club face has a first reflectivity;

a surface of the least one groove has a second reflectivity; and the first reflectivity is less than the second reflectivity.

7. The golf club head of claim 1, further comprising:

a coating over a portion of the club face;

wherein:

the at least one groove is devoid of the coating.

8. The golf club head of claim 7, wherein:

a thickness of the coating is less than 0.001 inch.

9. The golf club head of claim 8, wherein:

a surface roughness of the coating is different than a surface roughness of a surface of the at least one groove.

10. The golf club had of claim 9, wherein:

the surface roughness of the coating is 140 micro-inches to 180 micro-inches; and the surface roughness of the surface of the at least one groove is 30 micro-inches to 40 micro-inches.

11. A golf club head comprising:

a club face comprising:

a face portion;

at least one groove in the club face comprising:

a bottom;

a first side wall adjacent to the bottom, having a first side wall angle ranging between approximately 25 degrees and approximately 30 degrees;

a second side wall adjacent to the bottom, opposite the first side wall, having a second side wall angle ranging between approximately 25 degrees and approximately 30 degrees;

a first groove radius adjacent to the first side wall, ranging between approximately 0.0038 inch and approximately 0.0044 inch;

a second groove radius adjacent to the second side wall, ranging between approximately 0.0038 inch and approximately 0.0044 inch; and a second portion located between the face portion and one of a first top radius or a second top radius of the at least one groove, the second portion is a substantially flat plane at a first angle with the face portion and has a length of approximately 0.002 inch to 0.047 inch;

wherein:

the first angle is between approximately eight and eighteen degrees relative to the face portion; and the at least one groove is compliant with a Thirty Degree Rule when measured from the first top radius and the second top radius.

12. The golf club of claim 11, further comprising a loft of the club face ranging between 56 degrees and 60 degrees.

13. The golf club of claim 11, wherein:

the first side angle and the second side angle are both 28 degrees.

14. The golf club of claim 11, wherein:

the first groove radius and the second groove radius are both 0.004 inch.

15. The golf club head of claim 11, further comprising:

a coating over a portion of the club face;

wherein:

the at least one groove is devoid of the coating.

16. The golf club head of claim 15, wherein:

a thickness of the coating is less than 0.001 inch.

17. The golf club head of claim 15, wherein:

a surface roughness of the coating is different than a surface roughness of a surface of the at least one groove.

18. The golf club head of claim 17, wherein:

the surface roughness of the coating is 80 micro-inches to 110 micro-inches; and the surface roughness of the surface of the at least one groove is 20 micro-inches to 30 micro-inches.

* * * * *